UNITED STATES PATENT OFFICE.

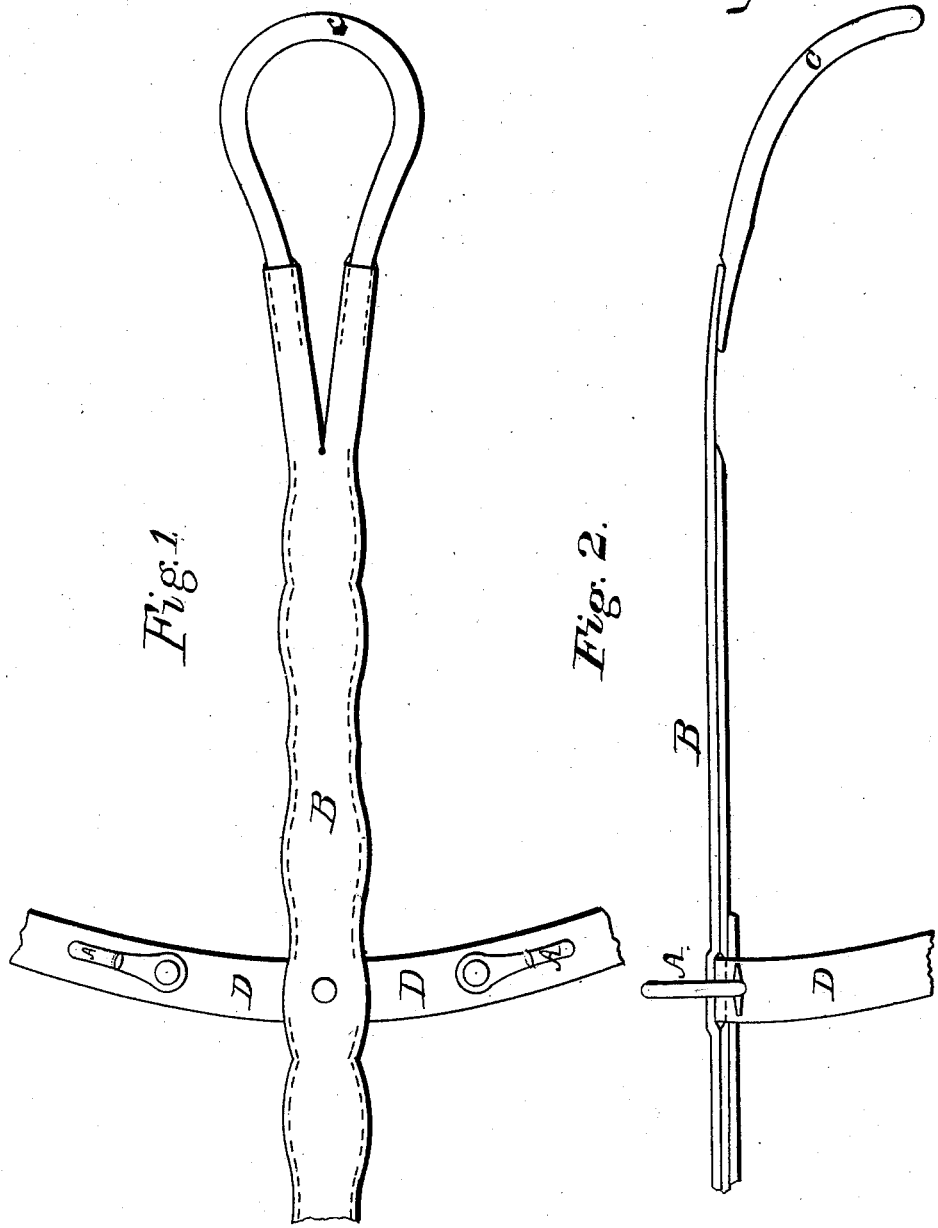

WASHBURN PEABODY, OF DIXMONT CENTRE, MAINE.

IMPROVEMENT IN HARNESS.

Specification forming part of Letters Patent No. 56,462, dated July 17, 1866.

*To all whom it may concern:*

Be it known that I, WASHBURN PEABODY, of Dixmont Centre, in the county of Penobscot and State of Maine, have invented a new and useful Improvement in Harnesses for Horses; and I do hereby declare the same to be fully described in the following specification and represented in the accompanying drawings, of which—

Figure 1 is a top view, and Fig. 2 an elevation, of a harness back-strap and breeching-stays provided with my invention, the purpose of which is to hold up the driving-reins and prevent them from slipping down the rump and against the thighs or the hind legs of a horse.

In carrying out my invention I arrange at and upon the junction of the back-strap and the breeching-stays of a harness two hooks, A A, substantially as represented in Fig. 2, the same being fastened to the harness so as to stand upright thereon, in manner as exhibited in such figure.

In the drawings, A A are the two hooks; B, the back-strap; C, the crupper, and D D the breeching-stays.

When the hooks A A are in use the driving-reins are to be laid within or between them, in which case they will serve to keep the reins from getting down on the rump of the horse and about his legs.

Having described my invention, what I claim, and desire to secure by Letters Patent, is as follows:

The arrangement, substantially as described, of the two rump-hooks A A with the back-strap of a harness, the same being for the purpose specified.

WASHBURN PEABODY.

Witnesses:
P. WHITE,
C. BICKFORD.